April 28, 1970 JAMES E. WEBB 3,509,475
ADMINISTRATOR OF THE NATIONAL AERONAUTICS
AND SPACE ADMINISTRATION
HIGH SPEED PHASE DETECTOR
Original Filed Feb. 7, 1964

INVENTOR.
GARY L. PARKER
BY J. H. Warden
Fleur & Cory
ATTORNEYS 3,509,475
HIGH SPEED PHASE DETECTOR James E. Webb, Administrator of the National Aeronautics and Space Administration, with respect to an invention of Gary L. Parker, Los Angeles, Calif.
Original application Feb. 7, 1964, Ser. No. 343,426, now Patent No. 3,364,311, dated Jan. 16, 1968. Divided and this application Sept. 26, 1967, Ser. No. 684,083
Int. Cl. H03b *3/04;* H03d *13/00*
U.S. Cl. 328—133 2 Claims

ABSTRACT OF THE DISCLOSURE

A high speed phase detector comprising an Exclusive OR input unit to which two square wave signals are applied as input signals. The positive state of the output signal of the input unit is a function of the phase relationship between the two input signals. A bootstrap integrator, to which the output signal of the input unit is supplied, provides a linear ramp voltage output signal which is initiated and terminated by the beginning and end, respectively of the positive state of the output signal of the input unit. A hold circuit is supplied with samples of the voltage provided by the integrator when the output signal of the input unit changes from a positive to a negative state.

CROSS REFERENCE TO OTHER APPLICATIONS

This application is a divisional application of application Ser. No. 343,426, filed Feb. 7, 1964, now U.S. Patent No. 3,364,311, in the name of James E. Webb, Administrator, National Aeronautics and Space Administration.

ORIGIN OF INVENTION

The invention described herein was made in the performance of work under a NASA contract and is subject to the provisions of Section 305 of the National Aeronautics and Space Act of 1958, Public Law 85-568 (72 Stat. 435; 42 USC 2457).

BACKGROUND OF THE INVENTION

Field of the invention

This invention relates to a phase detector and, more particularly, to a phase detector capable of high speed operation.

Description of the prior art

In U.S. Patent No. 3,364,311, issued on an application of which the present application is a division, a multiplex communication system in which frequency shift is eliminated is described. In such a system a phase detector, designated therein by numeral 106 in FIGURE 2(*b*), is required. Known phase detectors do not operate rapidly enough to be satisfactorily utilized as the phase detector 106. Thus, as pointed out in said patent, a phase detector is needed which operates more rapidly than prior art phase detectors.

OBJECTS AND SUMMARY OF THE INVENTION

It is a primary object of this invention to provide a new improved phase detector.

Another object of the present invention is to provide a phase detector for providing an indication of the phase relationship between two squarewave input signals.

A further object of this invention is to provide a phase detector which operates more rapidly than prior art phase detectors.

These and other objects of the invention are achieved by providing a phase detector which has an Exclusive OR unit to which two square wave input signals are supplied. The positive state of the output signal of the Exclusive OR unit activates a bootstrap integrator. The latter provides a linear ramp voltage which is initiated and terminated by the beginning and end, respectively of the positive state of the output signal. A hold circuit is supplied with a sample of the ramp voltage when the output signal of the Exclusive OR unit changes from a positive to a negative state.

The novel features of the invention are set forth with particularity in the appended claims. The invention will best be understood from the following description when read in conjunction with the accompanying drawings.

DESCRIPTION OF THE PREFERRED EMBODIMENTS

Figures 1, 2:
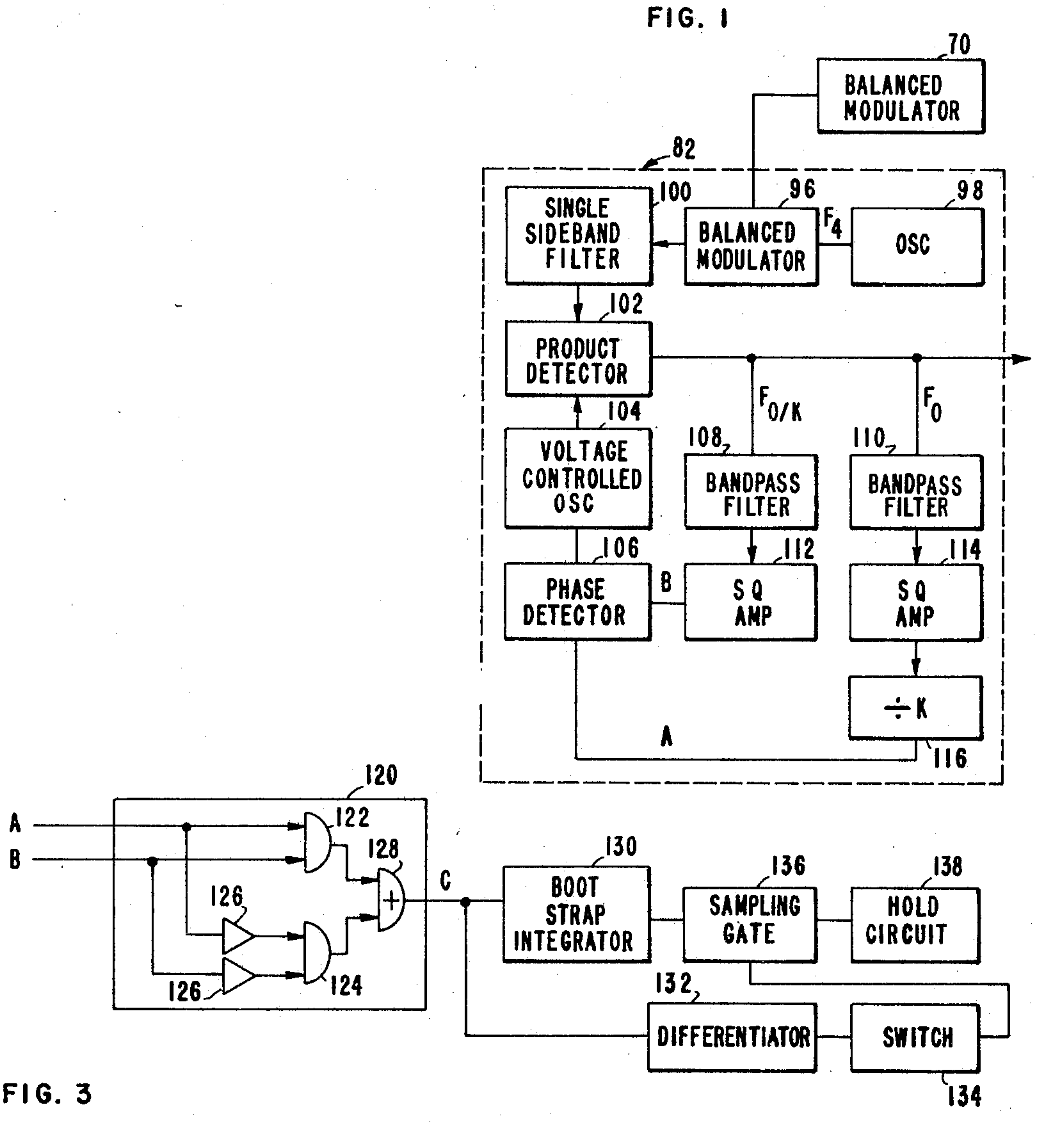
FIGURE 1 is a block diagram of an apparatus in a multiplex communication system in which the phase detector of the present invention finds particular application.
FIGURE 2 is a block diagram of the novel phase detector of the present invention.
Figure 3:
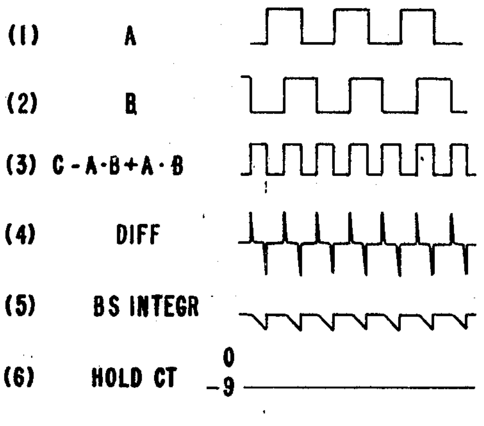
FIGURE 3 is a chart illustrating diagrams of various waveforms appearing at different points in the phase detector, shown in FIGURE 2.

Reference is now made to FIGURES 1, 2 and 3 which correspond to FIGURES 2(*b*), 3(*a*) and 3(*b*) respectively of U.S. Patent No. 3,364,311, issued on an application of which the present application is a division. In the figures in this application, the numerals which are employed are the same as those used in the corresponding figures in the patent.

FIGURE 1 herein represents a block diagram of a modulator 70 and an apparatus 82, which incorporates a phase detector 106. When high speed performance is required the phase detector shown in FIGURE 2 is incorporated.

Attention is initially called to FIGURE 3 which in line (1) thereof illustrates the waveform of a signal A representing the output of network 116 of FIGURE 1 and in line (2) thereof illustrates the waveform of a signal B representing the output of amplifier 112. From what has been said with respect to the operation of the apparatus of FIGURE 1, it should be apparent that the function required of the phase detector 106 is to compare the frequencies of the signals provided by the amplifier 112 and network 116. If very fast frequency comparison is desired, the rate of phase change of the signals, rather than the frequencies directly, can be considered. If the phase relationship between the signals applied to the phase detector 106 remains identical then, the frequencies of the signals are necessarily identical. The phase relationship between the waveforms A and B of FIGURE 3 is derived by applying the signals to an exclusive "or" logic circuit 120 which develops the function $$C=A\cdot B+\bar{A}\cdot\bar{B}$$

where C represents the logic circuit output signal. The logic circuit 120 includes a pair of And gates 122 and 124. The signals A and B are applied directly to the input of And gate 120 and through inverters 126 to the inputs of gate 124. The output of gates 122 and 124 are connected to the inputs of an Or gate 128. The waveform of the output signal derived from Or gate 128 is illustrated in line (3) of FIGURE 3.

If the frequencies of the signals A and B in lines (1) and (2) are identical and if the signals are exactly 90° out of phase, then the positive and negative states of the waveform in line (3) of FIGURE 3 will be of the same duration. If on the other hand the frequency of signal B increased while the frequency of signal A remained constant, then signal B would tend to slide to the left in FIGURE 3 and the durations of the positive states of the waveform in line (3) of FIGURE 3 would become longer. On the other hand, if the frequency of signal B decreased, then the duration of the positive states of signal C would become shorter. Thus, the duration of the positive states of signal C are indicative of the phase relationship between signals A and B applied to the logic circuit 120. In order to develop a voltage level proportional to the time duration of the positive states of signal C, the output of the logic circuit 120 is connected to the input of both a bootstrap intergrating circuit 130 and a differentiator circuit 132. The differentiator circuit 132 will provide an output signal consisting of very short positive and negative going pulses at the beginning and end, respectively of the positive states of the signal applied thereto. The output of the differentiator circuit 132 is illustrated in line (4) of FIGURE 3.

The bootstrap integrator 130 functions to provide a linear ramp voltage output signal which is initiated and terminated by the beginning and end, respectively of the positive states of the input signal applied thereto. The waveform of the output of the bootstrap integrator circuit 130 is illustrated in line (5) of FIGURE 3. A switch 134 that closes only during negative pulses, is connected to the output of the differentiator circuit 132. The switch 134 controls a sampling gate 136 whose input is derived from the output of the bootstrap integrating circuit 130. The output of the sampling gate 136 is connected to the input of a voltage holding circuit 138 which in its simplest embodiment comprises a capacitor connected in a long time constant circuit. Negative spikes provided by the differentiator circuit 132 control the switch 134 to in turn enable the sampling gate 136 for coupling the terminal ramp voltage signal level developed by the bootstrap integrating circuit 130 to the holding circuit 138. In order to prevent coupling the ramp voltage signal to the holding circuit exactly when the ramp portion is terminating, i.e. when it is dropping to zero, a slight delay is preferably incorporated in the integrator circuit 130.

Thus, so long as the signals A and B maintain the same phase relationship, and thus the same frequency relationship, the ramp terminal voltage level coupled through the sampling gate 136 to the hold circuit 138 will remain constant. Line (6) of FIGURE 3 illustrates a constant voltage available at the output of the hold circuit 138. A typical voltage which was utilized as the center voltage in a device constructed in accordance with the block diagram of FIGURE 2 was −9 volts and the dynamic range was from 0 to −18 volts.

Frequency translation in the transmission system of FIGURE 1 causing an increase in the relative frequency of signal B will cause an increase in the time duration of the positive states of signal C. Thus, the ramp voltages generated by the integrating circuit 130 will be terminated later and the voltage on the holding circuit 138 will move from −9 volts toward −18. In response to this change of direct current voltage level provided by the phase detector 106, the frequency of the output signal provided by the oscillator 104 is increased to in turn translate the data down scale to compensate for the relative frequency increase of signal B with respect to signal A. If on the other hand the frequency of signal B decreased with respect to the frequency of signal A, then the duration of the positive states of signal C would be shorter and the voltage level on the holding circuit 138 would move from −9 volts toward 0 volts. This change would reduce the frequency of the output signal provided by oscillator 104 to translate the data up scale to compensate for the frequency translation encountered in transmission.

There has accordingly been shown and descibed herein a novel high speed phase detector. The detector has been described in connection with its application in an apparatus forming part of a multiplex communication system. However, it should be apparent that the teachings of the present invention may be applied whenever a high speed phase detector is required.

What is claimed is:

1. Apparatus for rapidly comparing the frequency of first and second oscillating signals comprising means for respectively converting said first and second oscillating signals into first and second square wave signals having the same phase and frequency relationships as said oscillating signals, each of said square wave signals varying between first and secondary binary levels; logic means responsive to both said first and second square wave signals defining said first binary level for providing an initiating signal; circuit means responsive to said initiating signal for generating a voltage increasing linearly with respect to time; logic means responsive to both said first and second square wave signals defining said second binary level for providing a terminating signal; a voltage holding circuit; and means for coupling the concurrent level of said linearly incerasing voltage signal to said holding circuit in response to the provision of said terminating signal.

2. The apparatus of claim 1 wherein said circuit means terminate the generation of said linearly increasing voltage in response to the provision of said terminating signal.

References Cited

UNITED STATES PATENTS

| | | | |
|---|---|---|---|
| 2,725,528 | 11/1955 | Werner | 328—133 X |
| 3,054,062 | 9/1962 | Vonarburg | 328—133 |
| 3,287,195 | 6/1965 | Stefanov | 328—133 X |

JOHN S. HEYMAN, Primary Examiner

J. ZAZWORSKY, Assistant Examiner

U.S. Cl. X.R.

307—232; 324—83